April 20, 1948.     O. W. THRAILKILL     2,439,995
SECURING DEVICE
Filed April 11, 1944     2 Sheets-Sheet 1
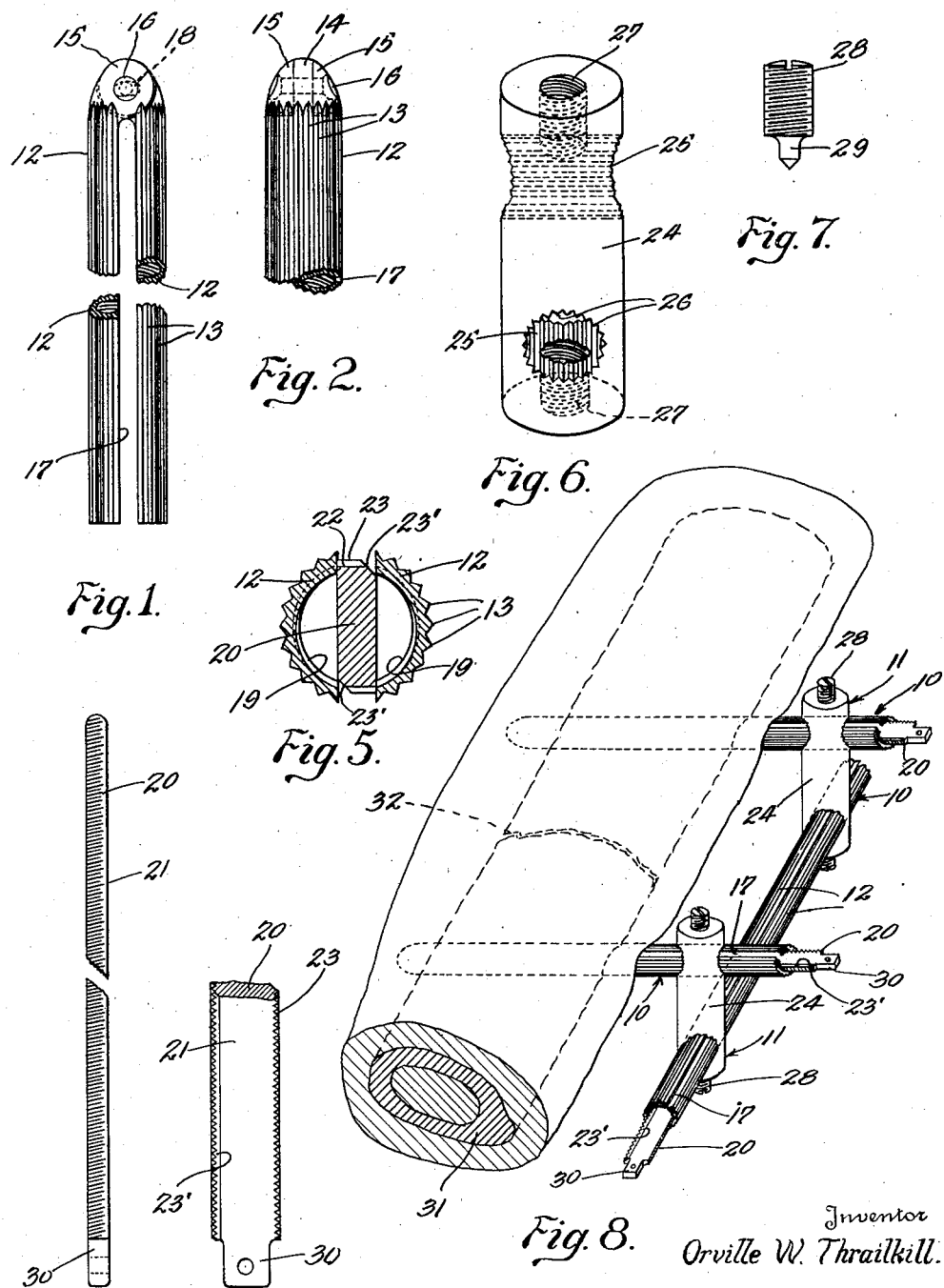
Inventor
Orville W. Thrailkill.
By Wilfred E. Lawson
Attorney

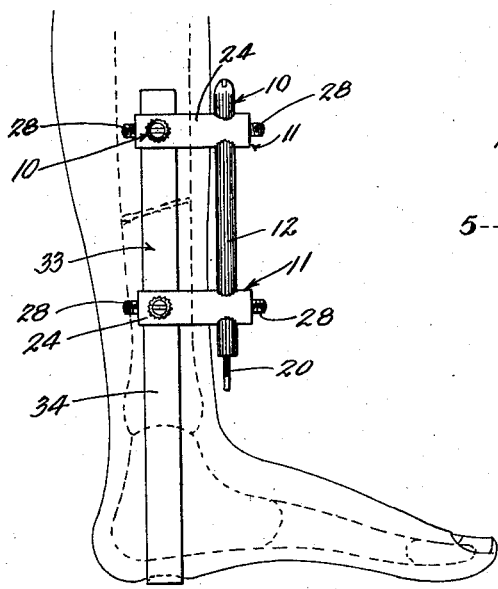
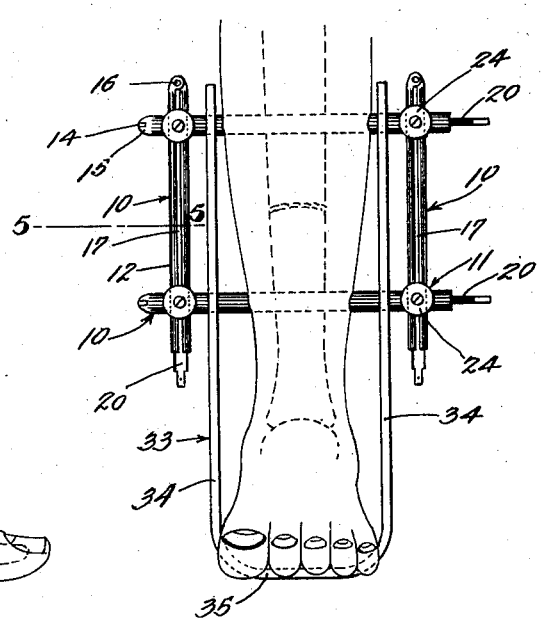
Fig. 9.    Fig. 10.
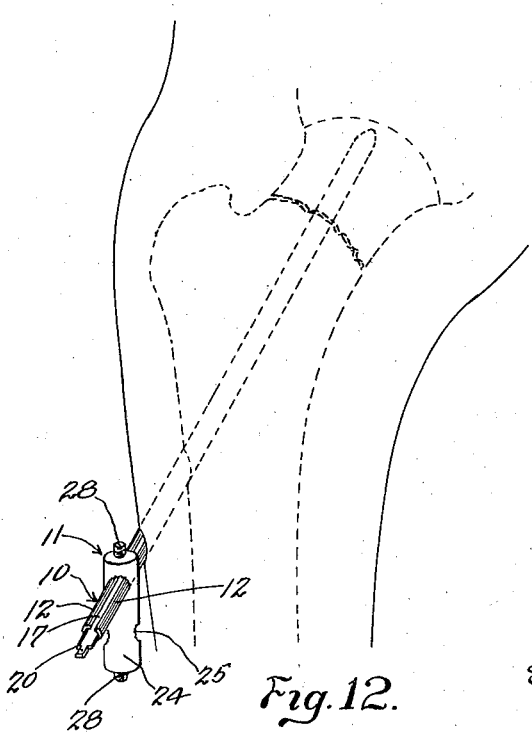
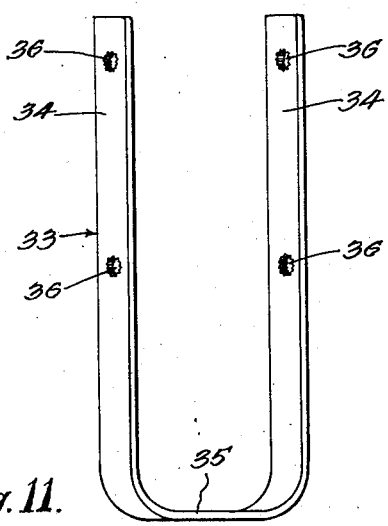
Fig. 11.
Fig. 12.
Inventor
Orville W. Thrailkill.
By Wilfred E. Lawson.
Attorney Patented Apr. 20, 1948

2,439,995

UNITED STATES PATENT OFFICE 2,439,995

SECURING DEVICE

Orville W. Thrailkill, Wellington, Kans.

Application April 11, 1944, Serial No. 530,488

15 Claims. (Cl. 128—84)

1

This invention relates generally to securing clamps or fastening devices by means of which two bodies may be brought into a predetermined relation and secured together and pertains more particularly to an appliance for reducing bone fractures and maintaining the parts in proper position during healing.

While the present invention may be advantageously employed for aligning and holding mechanical parts in a desired position, it is directed particularly to surgical use for facilitating the reduction of bone fractures of certain types, and maintaining the broken parts in proper relation until healing has taken place. Consequently the illustration and description of the invention will be confined to its application in the field of surgery although it is to be understood that in so illustrating and describing the invention no intention is had of limiting its use to such a field.

In the present method of reducing bone fractures and securing the parts by the use of pins, screws or threaded shafts, many hazards are present in addition to the fact that the procedure is slow because of the necessity of applying the pins or screws under fluoroscopy. Among the hazards is the probability of too much leverage being applied in screwing the pins or screws into the bone, causing a pin to snap off and thus leave the broken stub embedded in the bone thereby making it necessary to open the bone to take out the broken shaft piece or screw. Another hazard lies in the possibility of injuring tissue by causing the same to be rolled up on the drill or pin unless extreme care is employed in turning the same.

A principal object of the present invention is to provide an improved appliance for reducing bone fractures and securing the same during the healing period, which makes possible the reduction and setting of the fracture in materially less time than is at present required.

Another object is to provide a mechanical appliance for the purpose stated by which it is possible for an operator or doctor to set a fracture without danger of breaking off any pins or shafts in the bone.

Still another object is to provide in an appliance of the character stated, a construction wherein the parts which are extended into or through the bone are interchangeable with the part forming the connecting bar for holding the bone ends in proper set position, thereby making the assembling of the appliance particularly easy during the performance of the operation with a resultant reduction in the time necessary to perform the operation.

Still another object of the invention is to provide in an appliance of the character stated, parts which are extended into or through the bone in the place of screws or pins such as are at present employed, wherein a means is provided which prevents any possibility of such bone engaging parts turning in the bone or coming out of position, as sometimes occurs in the use of threaded pins, nails or wires.

Still another object of the invention is to provide an appliance of the character stated which may be readily joined to a frame for use as a ground engaging support, where the fracture occurs in the lower part of the leg, thereby avoiding the use of heavy casts or, where splints or casts are used, making it possible for the operator to remove such splint or cast each day without fear of the fracture slipping out of alignment, after the immediate edema has subsided, to give the passive motion he desires, and then replace the splint or cast.

The invention will be best understood from a consideration of the following detailed description taken in connection with the accompanying drawings with the understanding that the invention is not confined to a strict conformity with the showing of the drawings but may be changed or modified so long as such changes or modifications mark no material departure from the salient features of the invention as expressed in the appended claims.

In the drawings:

Figure 1 is a view in side elevation of one of the two-part tubes forming a part of the present invention.

Figure 2 is a view in elevation of the closed end of the tube turned 90° from the position shown in Figure 1.

Figure 3 is a view in edge elevation of the threaded rod designed for insertion in the tube.

Figure 4 is a view in elevation of the outer end portion of the rod, the same being turned 90° from the position shown in Figure 3.

Figure 5 is a view in cross-section of the tube and rod in assembled relation, with the rod in its initial position within the tube, section being taken substantially on line 5—5 of Figure 10.

Figure 6 is a view in perspective of a tie block or post.

Figure 7 is a view in elevation of a set screw which engages in an end of the tie post.

Figure 8 is a view in perspective illustrating the application of the invention to a fractured bone, using a pair of rod and tube units in the bone with a single rod and tube unit coupling the pair of units.

Figure 9 illustrates the use of the invention with a brace frame in connection with the treatment of a fracture of the lower leg, the leg and applicance being shown in side elevation.

Figure 10 is a view in front elevation of the appliance as illustrated in Figure 9.

Figure 11 is a view in perspective of the frame.

Figure 12 illustrates the use of a single tube and rod unit, and post in a fractured hip joint.

Referring now particularly to the drawings it will be seen upon reference to the several figures that the mechanical appliance forming the present invention basically consists of a tube and rod unit which is generally designated 10 and a post which is generally designated 11 and that these units may be used in varying numbers to build up the necessary tool or appliance for securing and holding a fractured bone while the same is healing.

The units 10 are inserted and secured in suitable holes drilled in the bone and may be braced and secured in the proper relation after traction has been applied and the fracture reduced, by the use of two posts and a third pin unit 10 connecting the first or bone attached pin units together as illustrated in Figure 8.

The unit 10 is in the form of a longitudinally divided tube, the two portions of which are designated 12. Each of these two portions 12 of the tube is exteriorly provided with the longitudinal ribs 13 and one of the tubes at one end has formed integrally therewith a single hinge ear 14 while the other tube is formed to provide the pair of spaced ears 15 between which the ear 14 positions, the ears being pivotally coupled together by the pivot pin or pintle 16.

The ears 14 and 15 are extended laterally from the respective tube portions 12 so that when they are pivotally coupled together the two tube portions will normally assume a spaced relation whereby there is formed between them the longitudinal recess or slot 17.

The tube sections or portions have relative movement while maintaining their parallel relation by the formation of a transverse slot 18 in the hinge 14, through which the pin 16 passes. Thus in addition to having relative movement while remaining parallel, the portions may also be relatively pivotally moved.

The inside of the tube made up of the two sections 12 is screw threaded as indicated at 19 and there is adapted to be extended into the tube the expander rod 20 which has the relatively wide flat opposite faces 21 and the narrower edge faces 22 which are transversely threaded as indicated at 23 at a corresponding pitch to the thread 19.

The width of the expander rod 20 between the threaded edges 22 is slightly greater than the inside diameter of the tube when the portions 12 thereof are in the closest relation or when the tube is closed.

Diametrically opposite corners of the expander rod 20 are beveled off or chamfered as indicated at 23', such beveled surfaces constituting cams to facilitate turning the rod when it has been inserted in the tube to lie with its narrow edge faces in the slot formed between the tube portions as illustrated in Figure 5. Thus it will be seen that when the tube is closed or has its two portions brought as closely together as possible so that the tube is of minimum outside diameter, and the expander rod is introduced to lie with its longitudinal edges in the slot between the tube portions, upon turning the rod on its long axis the beveled or camming corner surfaces 23' will ride in under the adjacent edges of the tube portions, causing the tube to be expanded to increased diameter. At the same time that the rod is turned to expand the tube, the thread teeth of the rod will enter between the teeth of the threads on the inner surfaces of the tube portions so as to lock the rod and the tube together, preventing the withdrawal of the rod.

The post or block unit 11 which is used in association with the pin unit 10, comprises the short cylindrical post body 24 through which are formed transversely the two openings 25 which are ribbed or fluted as indicated at 26. The fluting 26 of the openings 25 match the flutes or ribs 13 of the split tube and the diameter of each opening 25 corresponds to the maximum diameter of a tube so that when a tube is inserted into an opening 25 and is then expanded by the expander rod, it will completely fill the opening and the flutes of the tube will have locking engagement in the flutes of the opening 25 of the post to secure the post and tube together.

The openings 25 are formed through the post body 24 at right angles to one another and there is formed on the longitudinal center of the post body from each end, the threaded bore 27 which at its inner end opens into an opening 25.

The bores 27 receive set screws of the character illustrated in Figure 7 and designated 28. The inner end of each set screw is provided with the reduced pointed tip 29 which enters the slot 17 of a tube when the latter is extended through an opening 25 of the post body, and engages the expander rod 20 to prevent accidental turning of the latter.

The outer end of the rod 20 is flattened as indicated at 30 to form a suitable means for applying an implement or for grasping the rod so as to effect its turning in the tube.

Figure 8 illustrates one use of the appliance made up of three tube and rod units 10 and the two post units 11, for maintaining a fractured bone in place. The bone is designated 31 and the fracture 32.

In the use of the present appliance the patient is placed under fluoroscopy. After the parts of the appliance and instrument have been properly sterilized and the field of operation prepared, the region is placed under local anesthesia, exactly as when preparing to insert the Heap threaded shaft, the Steinman pin or Kirschner wire.

A small incision not over .5 cm. in length is now made, barely through the skin at a point that will place the drill point sufficiently far from the distal or proximal end of the fracture to allow a firm hold in the cortex for the drill. The operator now takes the proper size drill and drills through the bone, and removes the drill and inserts the split tube or cylinder into this hole in the bone. After this split tube or cylinder is inserted into the bone, the tie block or post body 24 is slipped on the end of the split tube. The oversize expander rod or plunger is then inserted into the split tube in the position illustrated in Figure 5 and given a quarter turn which causes the tube to be expanded as previously described and forces the edges of the flutes or ribs 13 into the bone. The operator then places the other split tube in the other end of the bone in a like manner.

The operator can now secure a firm hold on each split tube or cylinder to align the fracture.

After proper alignment is secured, another split tube is inserted into the tie blocks to form the tie rod and the expander rod is given a quarter turn locking the tie rod in the tie blocks. The locking screws are then inserted in the ends of the tie blocks so that the points will enter between the portions of the adjacent tubes and secure the expander rods against accidental turning. This gives a second positive locking to the whole unit to prevent any slipping of the tie rods or turning of the plungers.

Figures 9 and 10 illustrate the use of the unit in a somewhat different manner from that illustrated in Figure 8. In these views it will be seen that the bone engaging units 10 have the tubes extended through from one side of the limb to the other and there are then used two units 10 as tie rods between the bone engaging units, thus giving positive coupling or bracing at both sides of the fracture. There is also illustrated in these views the application to the transverse units 10, or bone engaging pins, of a foot enclosing frame which is generally designated 33, the use of which makes it possible for the patient to use the injured limb while healing or knitting is taking place. This frame is substantially U-shaped as shown, having the spaced parallel side bars 34 and the cross connecting bottom or yoke bar 35.

Each of the side bars 34 is provided with two openings or holes 36, the edges of which are fluted to correspond with the flutes of a split tube and the diameter of each hole is such as to receive the tube and allow for its full expansion whereby to lock the tube to the bar. Thus the two transverse units 10 passing through the bone portions and the two connecting vertical units connecting the transverse ones, form a rectangular brace frame with which the U frame is firmly coupled.

Figure 12 illustrates the use of one tube and rod unit 10 and a tie post to hold fractures of the anatomical neck of the femur and humerus. In this connection it will be seen that the unit 10 forming the pin which is extended into the drill hole formed in the bone, requires only one tie post unit 11 for maintaining the expander rod 20 against turning, by means of the set screw 28.

From the foregoing it will be readily apparent that the present invention provides for the construction of fracture holding appliances by the use of only two types of units, which units may be setup or assembled in various combinations and used in any number as illustrated in Figures 12, 8 and 10.

It will also be readily apparent that many of the hazards attendant upon the use of other forms of fracture pins, are avoided in the use of the present tube and rod unit because of the fact that the tubes and rods are not themselves drilled through the bone and therefore the possibility of breaking the fracture holding pins in placing them in position in the bone is avoided while at the same time the construction of the tube and rod unit is such that it can be firmly locked in the bone against accidental turning.

While, as previously stated, the device of the present invention is primarily designed for surgical use in setting and holding bone fractures, it will be apparent that the tube and rod units 10 might have other mechanical uses such as the holding together of sheet metal, sheet metal plates, tail and wing assembly on airplanes and other assembled airplane parts, as well as auto parts, in which have been formed holes having round or fluted edges like the holes 36 in the bar portions 35 of the frame 33. Also, use may be made of the split tube and expander rod for the alignment of rivet holes in plates, in connection with the manufacture of airplanes or other structures, whether made of metal, wood or plastics; consequently, it is to be understood that it is not wished to limit the invention entirely to surgical use.

I claim:

1. A device of the character stated comprising a tubular member longitudinally divided to form two portions, a loose coupling between said portions at one end permitting expansion and contraction of the tubular member from a minimum to a maximum diameter, an expander rod insertible into the tubular member and having a portion of maximum diameter greater than the minimum diameter of the tubular member, the rod having diametrically opposite camming surfaces spaced diagonally of the portion of maximum diameter for facilitating the turning of the rod from a position in which the plane of the maximum diameter is parallel with a plane passing between the opposing sides of the portions of the tubular member to a position in which the said plane of maximum diameter is transverse to the said plane passing between the opposing sides of the tube to effect the expansion of the tubular member, and means for preventing the turning of the rod upon its long axis in the tubular member.

2. A device as set forth in claim 1, in which said means comprises a member having an aperture formed therethrough for the reception of the tubular member, a set screw carried by the member and having an end extensible into the aperture, the said end of the set screw being pointed for extension between the portions of the tubular member to contact the bar.

3. A device as set forth in claim 1, wherein the tubular member has ribs extending longitudinally of its exterior surface, a member having an aperture for the reception of the tubular member and having the wall of the aperture ribbed for engagement with the ribs of the tubular member, and a set screw carried by the member and having an end extensible into the member aperture for engagement between the two portions of the tubular member.

4. A device as set forth in claim 1, in which the tubular member is interiorly screw threaded and in which only the portion of the rod of maximum diameter is screw threaded for connection with the threads within the tubular member.

5. A fracture appliance of the character stated, comprising a pair of tubular bodies longitudinally divided, coupling means between the portions of each body permitting expansion and reduction of the diameter of the entire body from end to end, each of said tubular bodies having exterior longitudinal ribs for locking engagement with the wall of an aperture formed in a piece of bone into which the tubular body is extended, means insertible into each tubular body for expanding the diameter of the body through its entire length to effect a locking connection between the ribs and the bone aperture into which the body is placed, a post adapted for mounting upon each tubular body, means for securing each post to the tubular body upon which it is mounted, and means for rigidly coupling together the posts carried by the tubular bodies.

6. A fracture appliance as set forth in claim 5, in which each of said posts has two transverse apertures therethrough with a tubular body extended through one of the apertures, means for securing each post to the tubular body extending therethrough, and the said means for rigidly coupling the posts together comprising a duplicate of the tubular bodies and the expanding means thereof having its ends extended through the other apertures of the posts, with means carried by the posts for securing the said duplicate body thereto.

7. A fracture appliance of the character stated comprising a pair of duplicate members each consisting of a longitudinally divided tubular body, coupling means between the two parts of the body by which relative movement of the parts is permitted to increase or decrease the diameter thereof, said tubular bodies being designed to be inserted through a bone upon opposite sides of a fracture, means insertible into each tubular body to effect the increasing of the diameter thereof through the entire length of the body whereby to secure the body in the bone, a substantially U-shaped frame having spaced side portions and a cross connecting portion, said side portions each having two apertures therethrough for the reception of adjacent ends of the tubular bodies, and means for establishing a rigid locking connection between the ends of one tubular body and the ends of the adjacent tubular body.

8. An appliance as set form in claim 7, in which the said rigid connecting means between two ends of the tubular bodies comprises a post secured upon each end of each tubular body and having an aperture transversely therethrough, and a duplicate of said tubular bodies and the expanding means therefor, having each end extended through an aperture of a post of each pair and secured thereto.

9. A device of the character described, comprising a longitudinally divided tubular body open at one end, a loose pivotal coupling between the parts of the tubular body facilitating relative movement of the parts while such parts are maintained in parallel relation, a member of greater length than the tubular body adapted to be introduced into the tubular body through said open end, said member being of constant width through the portion thereof lying within the tubular body, said member at opposite sides and the interior surfaces of the parts of the tubular body being relatively formed to effect the separation of the parts of the tubular body in parallel planes upon partial axial turning of the member after insertion into the tubular body, and means which becomes effective only after the stated partial turning of the member within the tubular body, for establishing a locking connection between the tubular body and the member.

10. A device of the character stated in claim 9, with an apertured securing unit adapted to receive the tubular body, and means carried by the securing unit for locking such unit on the tubular body.

11. A device of the character stated, comprising a longitudinally divided tubular body open at one end, a pivot coupling between the parts of the tubular body at the other end and including coacting slots whereby said parts have relative swinging movement and may be moved together and part while maintaining a parallel relation, an expander rod of non-circular cross section designed for extension into the tubular body through said open end, means for effecting the expansion of the tubular body upon the turning of the rod to a prescribed position therein, means for locking the rod against turning movement in the tubular body after being turned to the said prescribed position, and means for establishing an interlocking connection between the rod and the tubular body for maintaining the rod against longitudinal movement within the tubular body.

12. A device of the character stated, comprising a longitudinally divided tubular body open at one end, a pivot coupling between the parts of the tubular body at the other end and including coacting slots whereby said parts have relative swinging movement and may be moved together and apart while maintaining a parallel relation, an expander rod of non-circular cross section designed for extension into the tubular body through said open end, means for effecting the expansion of the tubular body upon the turning of the rod to a prescribed position therein, means for locking the rod against turning movement in the tubular body after being turned to the said prescribed position, the said means for securing the rod in the tubular body comprising a member having an aperture for the reception of the tubular body, and a set screw carried by said member and having an end extensible into said aperture for engagement between the parts of the tubular body.

13. A device of the character stated, comprising a longitudinally divided tubular body open at one end, a pivot coupling between the parts of the tubular body at the other end and including coacting slots whereby said parts have relative swinging movement and may be moved together and apart while maintaining a parallel relation, an expander rod of non-circular cross section designed for extension into the tubular body through said open end, means for effecting the expansion of the tubular body upon the turning of the rod to a prescribed position therein, means for locking the rod against turning movement in the tubular body after being turned to the prescribed position, the said means for securing the rod within the tubular body comprising a member having an aperture for the reception of the tubular body, an interlocking connection between the wall of the aperture and the tubular body preventing turning of the tubular body in said aperture, and a set screw carried by said member and having its inner end extensible into the member aperture for engagement between the two parts of the tubular body.

14. A securing device of the character stated, comprising a longitudinally divided tubular body open at one end, means coupling the parts of the body for relative movement while maintaining a parallel relation during such movement, means applicable to the body to limit the relative movement of the said parts, and means insertible into the body through the open end thereof for effecting separatory movement of the parts comprising a rod member which is rotatable in the body on its long axis to effect the stated separation of the parts, and means for effecting locking connection between said last means and the parts of the tubular body after rotating said rod member to a predetermined extent subsequent to its insertion into the tubular body.

15. A securing device of the character stated, comprising a longitudinally divided tubular body open at one end, means coupling the parts of the body for relative movement while maintaining a parallel relation during such movement, means applicable to the body to limit the relative movement of the said parts, and means insertible into the body through the open end thereof for effecting separatory movement of the parts, comprising a rod member which is rotatable in the body on its long axis to effect the stated separation of the parts, said rod member having opposing flat side faces and having camming surfaces formed longitudinally thereof at diagonally located corners of the side faces, the portions of the said rod member lying between said side faces and adjacent to said camming surfaces having teeth transversely thereof, and teeth formed spirally within the tubular body with which the teeth of the rod member are adapted to have locking connection upon the turning of the rod member through a predetermined extent from a predetermined initial position within the tubular body.

ORVILLE W. THRAILKILL.

REFERENCES CITED

The following references are of record in the file of this patent:

UNITED STATES PATENTS

| Number | Name | Date |
|---|---|---|
| 282,501 | Cornell | Aug. 7, 1883 |
| 469,025 | De Frehn | Feb. 16, 1892 |
| 610,308 | Seaman et al. | Sept. 6, 1898 |
| 703,796 | Lakhovsky | July 1, 1902 |
| 777,134 | Palmer | Dec. 13, 1904 |
| 840,549 | Aupke | Jan. 8, 1907 |
| 844,886 | Morris | Feb. 19, 1907 |
| 868,070 | Boles | Oct. 15, 1907 |
| 990,065 | Sargent | Apr. 18, 1911 |
| 1,022,261 | Rasmussen | Apr. 2, 1912 |
| 1,201,864 | Overmeyer | Oct. 17, 1916 |
| 1,224,926 | Hindmarsh | May 8, 1917 |
| 1,419,016 | Capirosso | June 6, 1922 |
| 1,848,142 | Peirce | Mar. 8, 1932 |
| 1,928,658 | Anderson | Oct. 13, 1933 |
| 2,077,804 | Morrison | Apr. 20, 1937 |
| 2,251,209 | Stader | July 29, 1941 |
| 2,381,050 | Hardinge | Aug. 7, 1945 |

FOREIGN PATENTS

| Number | Country | Date |
|---|---|---|
| 743,492 | France | Jan. 10, 1933 |
| 789,882 | France | Aug. 26, 1935 |